United States Patent [19]

Pool

[11] Patent Number: 5,589,056
[45] Date of Patent: *Dec. 31, 1996

[54] PROCESS FOR ELECTROECLAMATION OF SOIL MATERIAL

[76] Inventor: Wieberen Pool, Kaliumstraat 46, 9743 RV Groningen, Netherlands

[*] Notice: The term of this patent shall not extend beyond the expiration date of Pat. No. 5,433,829.

[21] Appl. No.: 424,073

[22] Filed: Apr. 19, 1995

Related U.S. Application Data

[63] Continuation of Ser. No. 47,079, Apr. 16, 1993, Pat. No. 5,433,839, which is a continuation of Ser. No. 680,607, Apr. 1, 1991, abandoned, which is a continuation of Ser. No. 255,988, Oct. 11, 1988, abandoned.

[30] Foreign Application Priority Data

Oct. 13, 1987 [NL] Netherlands ............................ 8702437

[51] Int. Cl.$^6$ ..................................................... C25F 1/00
[52] U.S. Cl. .......................... 205/766; 166/248; 204/515; 205/687; 588/204
[58] Field of Search .................................... 204/130, 147, 204/196, 180.1, 515; 166/248; 588/204; 205/687, 766

[56] References Cited

U.S. PATENT DOCUMENTS

| | | | |
|---|---|---|---|
| 2,053,214 | 9/1936 | Brown | 204/196 |
| 2,273,798 | 2/1942 | Heise et al. | 204/94 |
| 2,495,466 | 1/1950 | Miller | 204/197 |
| 2,831,804 | 4/1958 | Collopy | 204/182.8 |
| 3,227,643 | 1/1966 | Okun et al. | 204/415 |
| 3,616,354 | 10/1971 | Russell | 204/196 |
| 3,956,087 | 5/1976 | Drinkard | 204/107 |
| 3,970,531 | 7/1976 | Recht | 588/204 |
| 4,388,168 | 6/1983 | Burkhart | 204/196 |
| 4,479,857 | 10/1984 | Barton | 204/130 |
| 4,572,582 | 2/1986 | Ryeczek | 166/248 |
| 4,678,554 | 7/1987 | Oppitz | 204/180.1 |
| 4,832,803 | 5/1989 | Vennesland et al. | 204/147 |
| 4,958,271 | 9/1990 | Yoshida et al. | 364/200 |
| 5,074,986 | 12/1991 | Proisstein et al. | 204/180.1 |
| 5,098,538 | 3/1992 | Kim et al. | 204/180.1 |
| 5,137,608 | 8/1992 | Acar et al. | 204/180.1 |
| 5,240,570 | 8/1993 | Chang et al. | 204/180.1 |
| 5,256,264 | 10/1993 | Hundenborn et al. | 204/180.1 |

FOREIGN PATENT DOCUMENTS

| | | | |
|---|---|---|---|
| 3920342 | 8/1990 | Germany | 204/182.2 |
| 865225 | 9/1981 | U.S.S.R. | 204/182.2 |
| 512762 | 11/1937 | United Kingdom . | |

*Primary Examiner*—T. Tung

[57] ABSTRACT

This invention relates to a process for electroreclamation of soil material. A plurality of electrodes is brought into current-conducting connection with the soil material to be reclaimed. One or more of the electrodes are brought into current-conducting connection with the positive or negative pole of a source of DC voltage, and the remaining electrodes are brought into contact with the other pole of the source of DC voltage. There are thus formed one or more anodes and one or more cathodes. An electric current is passed through the soil material to be reclaimed between the differently charged electrodes. According to the invention, the physicochemical parameters of the medium of both the regions adjoining the anode(s) and the regions adjoining the cathode(s) are controlled.

10 Claims, 2 Drawing Sheets

PROCESS FOR ELECTRORECLAMATION OF SOIL MATERIAL

This application is a continuation of U.S. application Ser. No. 047,079 filed Apr. 16, 1993, now U.S. Pat. No. 5,433, 839 issued Jul. 18, 1995, which in turn is a continuation of U.S. Ser. No. 680,607 filed Apr. 1, 1991, now abandoned, which is a continuation of U.S. application Ser. No. 255,988, filed Oct. 11, 1988 and now abandoned.

This invention relates to a process for electro-reclamation of soil material, comprising bringing a plurality of electrodes into current-conducting connection with the soil material to be reclaimed; bringing a portion of the electrodes into current-conducting connection with the positive or negative pole of a source of DC voltage, bringing the remaining portion of the electrodes into contact with the other pole of said source of DC voltage, thereby forming one or more anodes and one or more cathodes, and passing an electric current through the soil material to be reclaimed between the differently charged electrodes.

Electrokinetic techniques for the in-situ treatment of soil are known. Thus British patent 512,762 discloses a process of this kind, used for de-watering clayey sediments under the influence of electroosmosis. U.S. Pat. No. 2,831,804 discloses a process for the electrokinetic in-situ treatment (electroreclamation) of agricultural soils for the desalinification thereof. Electroreclamation here means the removal of alkaline salts and alkali metal ions from agricultural soils by means of electrokinetic techniques, generally achieving an improvement of the earth by electrochemical means, whereby an electric current is passed via a series of electrodes through the subsoil. This brings about a number of processes, that is to say:

Electroosmosis: the movement of ground water from the anode to the cathode owing to a difference in potential;

Electrophoresis: the movement of solid (soil) particles within a stationary liquid owing to a difference in potential;

Electrolysis: the movement of ions and ion complexes in an electrolyte owing to a difference in potential.

Electroreclamation is then the aggregate of the above three processes.

In the known electrokinetic techniques for the in-situ treatment of soil material in which a series of anodes and cathodes are introduced into the earth, a number of problems occur, which can be summarized as follows:

In the case of electroosmosis:

corrosion and dissolution of the anode acidification of the medium (soil+ground water) at the anode rapid desiccation at the anode alkalinization of the medium (soil+ground water) at the cathode.

Especially the rapid desicattion at the anode gives, after some time, such a high electrical resistance that the electroosmotic effect is greatly decreased.

In the case of electroreclamation:

corrosion and dissolution of the anode acidification of the medium (soil+ground water) at the anode desiccation at the anode alkalinization of the medium (soil+ground water) at the cathode.

It is an object of the present invention to provide a process for the electrokinetic treatment of soil with a considerably broader effect than de-watering (electroosmosis) or desalinification alone, and by means of which, quite generally, pollutants in the soil, which for example occur as ions in the ground water or adsorbed to the soil material, can be removed, and whereby the process is applicable both in situ and to soils dug up earlier (on site) without the problems outlined above.

More specifically, considering the grave pollution of the ground with heavy metals and, for example, cyanides and like materials, which frequently becomes manifest at present, particularly also in land with buildings, it is an object of the present invention to provide an electrokinetic processing method for the cleaning thereof at acceptable expense and to such a degree that the ground again satisfies official environmental and residential safety norms.

According to the present invention, the process as recited in the opening paragraph is characterized in that the physicochemical parameters of the medium of both the regions adjoining the anode(s) and the regions adjoining the cathode(s) are controlled.

In U.S. Pat. No. 3,956,087, a method is described, in which the earth is made part of an electric system through which electric current can be passed. For this purpose a positive source for direct current is contacted with the earth to form an anode for the electric system. Furthermore, a cathode is included in the electric system which through a halogen salt containing electrolyte surrounding the cathode is brought into current-conducting connection with the earth. Between the anode and the cathode an electric potential is maintained, while passing an electric current through the earth. The electrolyte can be included in a recycle system in which the electrolyte is continuously or periodically removed from the cathode region to be treated elsewhere for re-adjustment of its composition when this has changed under the influence of the current passage, whereafter the electrolyte is re-passed to the cathode region. Furthermore, the cathode may be housed in a compartment, for example, within a housing placed in the earth. The object of the known method is, however, to extract copper from a sulphidic copper deposition present in the earth, such as a deposit of pyrite and chalkopyrite, by electrochemical means. The known method has nothing to do, however, with the electroreclamation of the earth or, quite generally, of soil material, as the process according to the present invention, in which the object of electroreclamation is to bring polluted ground material, for example, earth polluted with heavy metals, back into its original state, or at any rate into a state which is acceptable for practical purposes and satisfies safety norms, so that it is no longer harmful to humans, plants and animals, and is again habitable and livable, by an electrokinetic treatment. Moreover, the known method employs an anode which under the influence of the voltage to be applied between the anode and the cathode will decompose to form decomposition products which under the influence of the voltage applied between the anode and the cathode are freely transported through the earth in the direction of the cathode, which is not the case in the process of the present invention. The known method also does not refer to an anode which adjoins an anode region whose medium, just as that of the region adjoining the cathode, is controlled in its composition. Generally speaking, in the known method, the condition in which the earth is left after the electrochemical extraction of the copper from the copper deposition, is not a point of consideration.

DETAILED DESCRIPTION OF THE INVENTION

Figure 3:
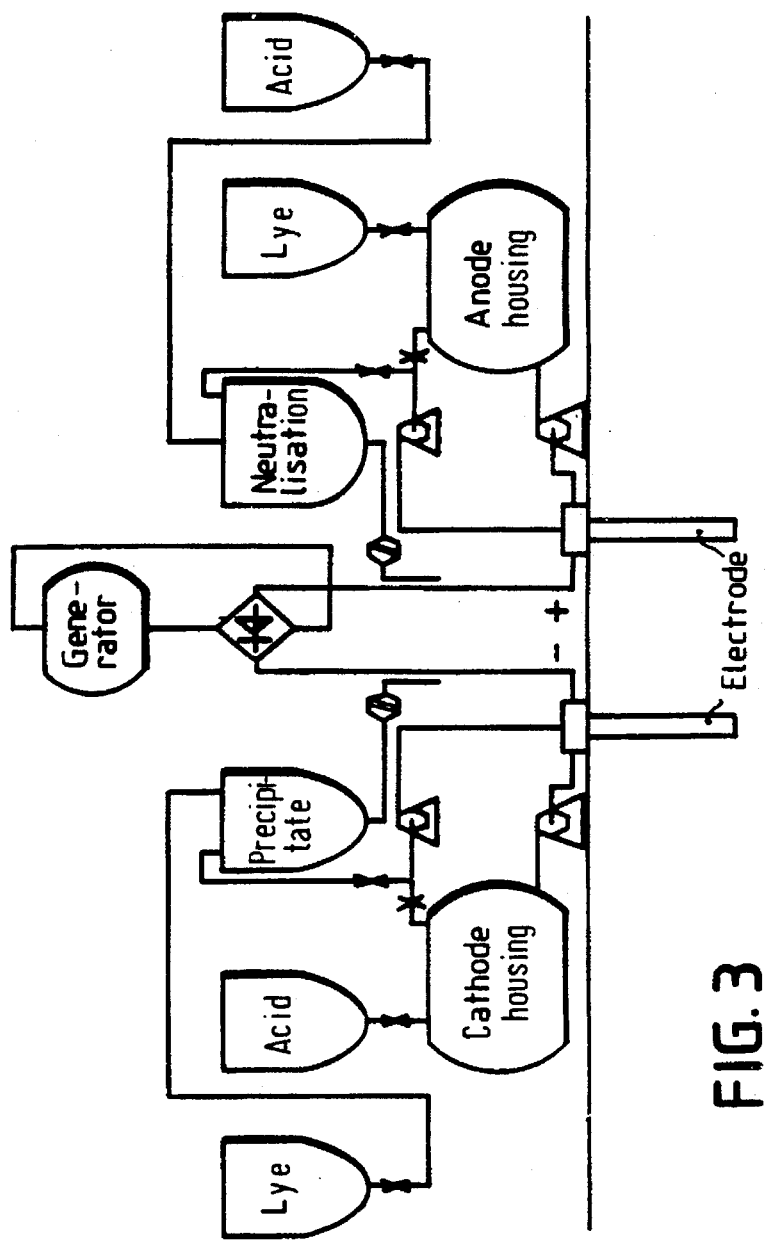
FIG. 3 is a diagram showing an example of the apparatus that is useful in practicing the invention.

In a further elaboration, the process according to the present invention is characterized in that the anode(s) and the cathode(s) are brought into current-conducting connection with the soil material indirectly by surrounding the anode(s) and cathode(s) with a current-conducting liquid or pasty material.

The physico-chemical parameters in the anode and cathode mediums can be controlled in an effective and hence preferred manner in the process according to the present invention, if, in accordance with a preferred embodiment of the present invention, the anode(s) and cathode(s) are surrounded by a current-conducting aqueous liquid material, with the current-conducting aqueous liquid material surrounding the anode(s) being included in a circulation system for the anode(s), and the current-conducting aqueous liquid material surrounding the cathode(s) being included in a circulation system for the cathode(s), and, to control the medium of the regions adjoining the anode(s) and the cathode(s), one or more chemical conditioning agents are added, through the corresponding circulation systems, to the aqueous liquid material of the anode(s) and to the aqueous liquid material of the cathode(s) in a region outside the current-conducting aqueous liquid material surrounding the anode(s) and the current-conducting material surrounding the cathode(s).

The process according to the present invention, which will be described in more detail hereinafter, can be used for the in-situ cleaning of a land polluted with undesirable materials, for example, heavy-metal salts, cyanides, etc., and also for screening off a polluted land against the migration of the pollutant(s) from the land, or as a preventive screening of a potentially pollutable land in the case of migration of the pollutant(s).

By controlling, in accordance with the present invention, the physico-chemical parameters of the medium of the regions adjoining the anode(s) and the cathode(s) by supplying specially selected materials to said regions, for example, by adding a Ca ions containing solution or by adding a complexing material, for example, EDTA, to the anode medium, the composition of the medium of the region located between the anode(s) and cathode(s) can also be adjusted and conditioned.

Accordingly, within the framework of the process according to the present invention, the conditioning of soil material means both maintaining, and adjusting to, a desirable composition of the soil material.

The electric current passed between the anode(s) and cathode(s) through the material being cleaned may be a direct current only, but it is also possible to perform the process according to the invention with a direct current with an alternating current superimposed thereon, or with a pulsing direct current.

The invention also relates to an electric current system for carrying out the process according to the invention by electrokinetic treatment, comprising a source of DC voltage with a positive pole and a negative pole;

one or more anode(s) connected to the positive pole in current conducting fashion and capable of being brought into current-conducting connection with the soil material, and one or more cathode(s) connected to the negative pole and capable of being brought into current conducting connection with the soil material, said current system being characterized in that said one or more anodes and said one or more cathodes are each housed in a housing including means for connecting the housing to a supply means and to a discharge means of a liquid circulation system, said housing being permeable to current, ions, charged particles and liquid, and said one or more anodes being made of a material which during operation of the electric current system is not decomposable or is decomposable forming product of decomposition not migratable outside the housing(s) in the direction of the cathode(s).

In this arrangement, the housings may each include means through which one or more sensors can be brought into contact with anode mediums and cathode mediums to be maintained in said housings and serving for the current conducting connection with the soil material. Naturally, it is also possible to arrange one or more sensors in the circulation systems for the anode(s) or cathode(s).

A suitable material for the anode(s) according to the present invention is a noble metal which under the conditions of the electroreclamation process is not decomposable. In practice, the cost of an anode made of such a material may be prohibitive, however, and the use of a non-noble material may be preferred. When selecting such a material it should be ensured according to the present invention that the products of decomposition formed from the anode material selected during the electroreclamation process cannot migrate outside the housing of the anode through the soil between anode and cathode. One example of such a material is carbon. It is true that, under the influence of the electroreclamation process, an anode of carbon will be corroded in time. However, the products of decomposition formed at or from the carbon material of the anode are gaseous and can be removed from the anode housing in a simple manner, or solid and settle within the anode housing, or at any rate are not transportable outside the anode housing. The invention is accordingly based on the insight that the effects occurring during the electroreclamation throughout the entire region of the earth to be cleaned between anode(s) and cathode(s) should be actively controlled and adjusted locally within and from the regions adjoining the anode(s) and the cathode(s), thereby to prevent undesirable-side effects.

The housings of the electrodes may take the form of a chamber closed all round, one or more walls of which are made of a porous ceramic material, but may alternatively take the form of a hollow tube. The form of housing selected depends partly upon the nature of the soil material to be treated.

The invention finally also relates to an electrode housing for use in the electric current system according to the present invention.

Figure 1:
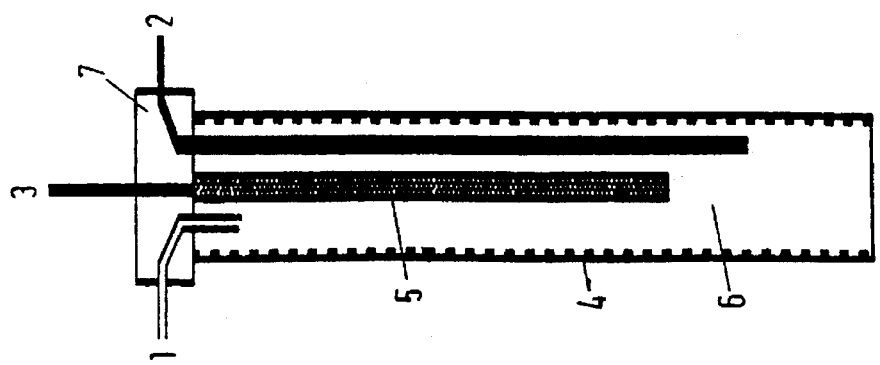
FIG. 1 is a longitudinal sectional view of an electrode housing for use in the invention.

The electrode housing according to the invention will now be described in more detail with reference to the accompanying FIG. 1, which illustrates one embodiment thereof by way of example in longitudinal sectional view.

As shown, the electrode housing comprises a tubular housing 4, the tube wall of which is provided with perforations and thus is permeable to current and liquid. The housing 4 is sealed with a cover 7 at the top (as viewed in the drawing). Passed through the cover are conduits 1 and 2, respectively serving for the supply and discharge of electrode liquid to, and from, space 6. Through conduits 1 and 2, the electrode housing can be connected to a liquid circulation system not shown in FIG. 1. In FIG. 1, reference numeral 5 designates an electrode, for example, an anode of carbon, which through a current conducting cable 3 can be connected to the corresponding pole of a source of DC voltage, not shown.

The process according to the invention is illustrated in and by the following example.

EXAMPLE

A practical experiment was conducted for cleaning a gravely polluted site of a former paint factory.

The land in question had a surface area of about 200 m² and was situated adjacent to a ditch bank The ditch bank had been raised with material from the ditch, which was polluted by paint waste material lying on the other ditch bank and coming from the former paint factory.

The most polluted material was located in a strip about 3 meters wide from the ditch side, the pollutants being heavy metals, such as copper, lead, zinc and cobalt.

In the upper 50 cm of the layer by the ditch bank, that is to say, the raised portion, the heavy metals were especially present in the form of paint waste material. Lead and copper occurred respectively in concentrations of about 10,000 and 5000 ppm.

Under this layer was the original peat-rich sediment, which, prior to the electrokinetic treatment, depending on the location and depth, contained up to 2000 ppm of both copper and lead.

These high concentrations were especially due to the acid character of the peat ground (pH=3–4) and the often high ground water levels.

In addition to the contamination with the paint waste material, which occurred in the raised layer both in very fine particles and in lumps of several centimeters in diameter, the site in question was littered with fully or partially rusted iron objects.

Prior to the electrokinetic treatment, these object partially traced with a metal detector, were removed from the field, whereby rather a large amount of rust had to be left behind.

On the ground of the high permeability of the peat soil (1 m/day) and by reason of the actual situation (ditch bank) an arrangement had been selected for this experiment, in which the cathode was placed as a horizontal tube right along the side of the ditch, and the anodes in groups of vertical tubes.

By means of geoelectric measurements, the specific resistance of the ground had been determined, and in order to obtain a sufficient voltage drop per meter, a 50 kW generator was used as a source of current.

Figure 2:
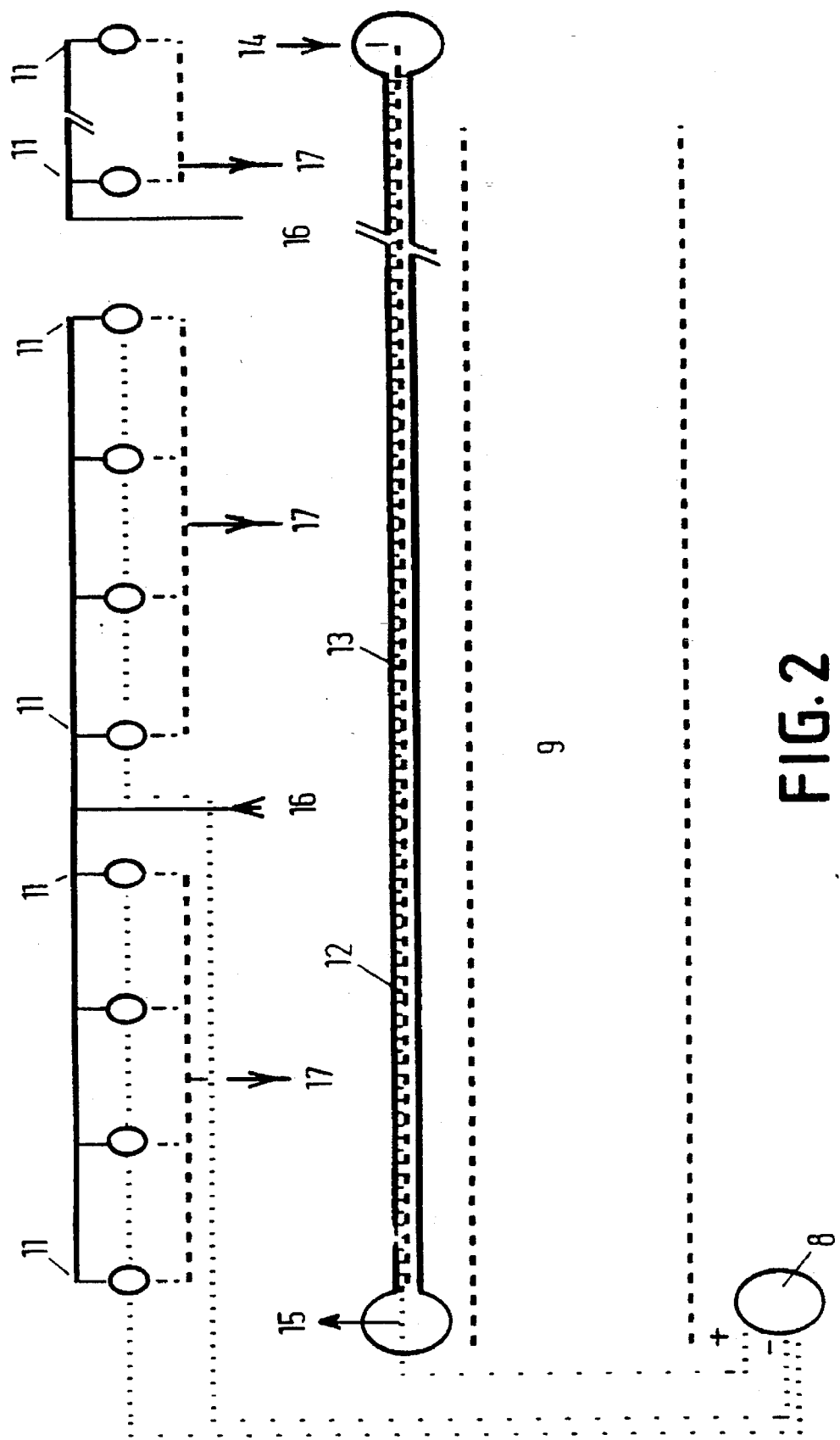
FIG. 2 is a diagrammatic representation of the electrical system utilized in a practical test made according to the invention.

The three phases of each 200 $V_{ac}$ of this 50 kW generator were rectified to about 220 $V_{dc}$ and loaded equally by 9 groups of anodes, with the neutral current conductor being connected to the cathode. A diagrammatic representation of the arrangement of the electrical current system used in the practical experiment and of the location where the test was conducted is shown in FIG. 2, in which 8 represents the generator and 9 the ditch.

As anodes 11, carbon rods 50 cm long and 3 cm in diameter were used, which were placed in a perforated gauge pipe 1 m long and 10 cm in diameter.

Depending on the local situation, the anodes were spaced apart distances of 1.5 to 2 m and, in groups of 4 anodes, provided with energy and ammeters and, in groups of 8 electrodes, provided with electrode liquid, supplied through conduit 16 and discharged through conduit 17.

The cathode 12 consisted of an iron cable arranged horizontally within porous drainpipes 13, spaced 3 m from the anodes.

By means of a laser beam, the tubes had been laid with a fall of about 15 cm to the North in a trench 30–50 cm deep, which was then covered with the material excavated.

The porous brick tubes 13 had been selected because the ground material (peat) was both highly porous and highly permeable, and thus obstructed electroosmotic transport to cathode 12.

Through the ceramic wall, the cations were transported to the cathode 12 in drain pipe 13, for them to be subsequently discharged through conduit 15 to a receptacle within a circulation system together with the other electrode liquid supplied through conduit 14.

To prevent the wall of tube 13 from becoming clogged with hydroxides, control of the pH was necessary, and accordingly acid was continuously supplied to the cathode liquid during the experiment.

In the receptacle, pH and conductivity were measured, and when the concentration of the metal ions to be removed had increased sufficiently, the liquid was passed to a precipitation vessel, and the cations were precipitated by means of lye. After filtration of the remaining liquid, this liquid was pumped back into the cathode receptacle and/or discharged as sewage.

FIG. 3 shows the entire flow diagram of the process used in the practical experiment, in which, for the sake of clarity, the electrodes are shown separated from the electrode spaces proper.

During the electrokinetic treatment, it was found that the periodic addition of ditch water to the anodes was sufficient, and also provided an effective control of the current intensity to the various anodes.

In addition to the parameters mentioned above, such as current intensity, pH and conductivity, the voltage drop in volts per meter and the temperature in degrees centigrade were measured continuously at two locations at a depth of 50 cm between anode and cathode.

In total, the field had been treated for about 430 hours over 50 working days with an average power of about 35 kW, i.e. 15,000 kW for 220 m² polluted soil or about 350 m³ (=about 505 tons) of soil, with the average measured voltage drop between cathode and anodes being about 40 V=/m.

Before, during and after the electrokinetic treatment, samples were taken from the soil at marked positions at different depths and at various distances between anode and cathode, which were analyzed for heavy metals by means of X-ray fluorescence.

After evaluation of these analyses, it was found that the content of the heavy metals, such as lead, copper, zinc and cobalt, in the undisturbed peat-rich soil had been reduced virtually to the normal values which are not considered harmful to public health, while in the raised layer, the contents of heavy metals had been decreased by several tens of percents, depending on the original values.

By supplying excess ditch water to the anodes, the anode liquid (=ditch water+anions) flowed over the soil to the ditch, whereby in the puddles formed on the field at various places, a strong growth of algae was noted.

The migrated cations such as Ca, Mg, Sr, Fe, Zn, Ni, Co, Mn, Cu and Pb, had collected within and around the cathode tube 13.

Cations such as Ca, Mg, Sr, Fe, Zn, Ni, Co, Mn, had collected mainly within the tubes and were subsequently precipitated with lye and collected as hydroxides, while copper and lead had partly precipitated onto the iron cathode cable.

Small-scale experiments parallel to the practical experiment show that, unlike zinc, for example, copper and lead were only poorly transportable through the porous brick wall of the drain pipes.

In total, about 27 kWh/ton soil of power was used during the practical experiment with an efficiency of about 60%.

The remainder of the power had been converted into heat, which was especially manifest at the cathode.

The soil temperature at a depth of 50 cm and 50 cm from the cathode increased to ten degrees centigrade above the normal soil temperature.

It will be clear that the parameters of the conditioning process of soil material according to the invention, for example, the voltage to be maintained between the anode(s) and cathode(s), the composition of the mediums of the regions adjoining the anode(s) and cathode(s), which composition is to be controlled, the duration of the treatment, etc., depend upon the nature of the soil-being treated (sand, peat, clay, etc.), the nature (heavy metals, harmful anions, etc.) and degree of pollution thereof, etc. and hence cannot be predicted, but should be determined for each individual case.

In removing heavy metal-salts and/or ions from soils polluted therewith by means of electrokinetic techniques, as in the practical experiment described above, the following problems may present themselves around the electrodes.

at the cathode

Under the influence of the voltage applied, the positively charged particles dissolved in the ground water, such as (metal) ions, complexes (electrolysis), water (electroosmosis) and possibly other mobile particles collect at the cathode;

Owing to transfer of electrons, gaseous hydrogen and hydroxyl ions are formed at the cathode, as a result of which the aqueous medium at the cathode becomes alkaline;

Virtually all heavy-metal ions form insoluble hydroxides in alkaline medium;

As the negatively charged hydroxyl ions formed during the process will move in the direction of the anode, the alkaline medium will move progressively in the direction of the anode until a condition of equilibbrium is formed owing to neutralization of the hydrogen ions formed at the anode by transfer of electrons, and moving towards the cathode;

The ultimate result is a belt of precipitated hydroxides at the cathode, whereby the hydroxides precipitate in the pores, so that the porosity of the soil decreases and its electrical resistance increases to such an extent that all electrokinetic effects are minimized.

Accordingly, in this process, the soil around and adjacent to the cathode can remain greatly polluted.

at the anode:

Under the influence of the voltage applied, the negatively charged particles dissolved in the ground water, such as ions and complexes and possibly other mobile particles, collect at the anode;

Owing to transfer of electrons, hydrogen ions form at the anode, as a result of which the medium around the anode is acidified;

The positively charged hydrogen ions formed migrate to the cathode under the influence of the electric field;

At the start of the process, the formation and migration of the hydrogen ions has a favourable effect, such as the exchange of hydrogen ions with the metal ions and complexes adhering to the clay particles;

During the process, the medium at the anode is acidified to such an extent that the clay minerals present in the soil may be partially decomposed to form aluminium compounds toxic to plants;

The electric power required to move the undesirable positively charged metal ions and complexes is used virtually completely, during the process, for the movement of the hydrogen ions formed at the anode in the direction of the cathode.

By virtue of the method according to this invention, in which the electrodes are not directly contacted with the soil, but within a housing, which makes it possible to control the composition of the anode and cathode mediums, the electrokinetic treatment of the soil can be well controlled, as shown by the practical experiment.

By reference to FIG. 3 it can be seen that the addition of acid, as needed, to the cathode medium will prevent the problems discussed above from becoming manifest at the cathode while the addition of lye, an alkaline substance, as needed, to the anode medium will prevent the problems discussed above from becoming manifest at the anode.

A flow sheet which can be used for the performance of the process according to the invention may include a measuring and regulating system by means of which the electrokinetic process may be highly automated. Thus the measuring and regulating system may include means for continuously monitoring the condition of the electrodes. Such means may be based on recording the cumulative service life of the electrodes in which, partly taking into account the composition of the soil, a standard can be found for changing the electrodes.

The apparatus for carrying out the process according to the invention, for example, as shown in FIG. 3, excluding the generator and the electrodes, but including a measuring and regulating system, is suitable for being built into a container for it to be easily transported to any location as a transportable unit, where it can be set up and connected to a generator. Naturally, the electrode system should be designed for each project.

I claim:

1. An electroreclamation process for removing from soils polluted therewith, contaminants having the ability to move toward an electrode under the influence of an electric current, which comprises the steps of:

(a) enclosing within a porous housing at least one electrode adapted to serve as a cathode when connected to the negative pole of a DC voltage source and placed in current conducting relationship with at least one anode;

(b) enclosing within a separate porous housing at least one electrode adapted to serve as an anode when connected to the positive pole of a DC voltage source and placed in current conducting relationship with at least one cathode;

(c) placing the separately housed electrodes of steps (a) and (b) in current-conducting relationship with one another and with the soil to be treated;

(d) supplying a medium capable of conducting current to the housed electrode(s) of step (a) through a cathodic circulation system and supplying a medium capable of conducting current to the housed electrode(s) of step (b) through a separate anodic circulation system;

(e) connecting the housed electrode(s) of step (a) to the negative pole of a DC voltage source and the housed electrode(s) of step (b) to the positive pole of a DC voltage source, thereby forming at least one cathode and at least one anode;

(f) passing an electric current through the soil to be treated and between the cathode(s) and anode(s), thereby causing migration of contaminants through the soil;

(g) removing the contaminants which migrate to the cathode(s) and the contaminants which migrate to the anode(s); and (h) monitoring, and when necessary, controlling and adjusting the pH, conductivity, temperature and current intensity of the medium within each of the cathodic circulation system and the anodic circulation system.

2. The process of claim 1 wherein step (h) is effected by adding at least one chemical conditioning agent to at least one of the medium within the cathodic circulation system and the medium within the anodic circulation system.

3. The process of claim 2 wherein pH of the medium within the cathodic circulation system is controlled by adding acid thereto.

4. The process of claim 2 wherein step (h) is effected by adding a solution containing $Ca^{++}$ ions to at least one of the medium within the cathodic circulation system and the medium within the anodic circulation system.

5. The process of claim 2 wherein the pH of the medium within the anodic circulation system is controlled by adding alkaline material thereto.

6. The process of claim 1 wherein the anode(s) comprise a material which does not decompose under current passing conditions.

7. The process of claim 6 wherein the anode(s) comprise a noble metal.

8. The process of claim 1 wherein the anode(s) comprise a material which forms decomposition products under current passing conditions, said decomposition products being of a nature such that they are not capable of migrating through the anode housing(s).

9. The process of claim 1 wherein the anode(s) comprise a material which forms decomposition products under current passing conditions, which decomposition products are gaseous and are removed from the anode housing(s) in that form.

10. The process of claim 9 wherein the anode(s) comprise carbon.

* * * * *